No. 839,325. PATENTED DEC. 25, 1906.
R. F. SCOTT.
HOISTING MECHANISM.
APPLICATION FILED NOV. 12, 1904.

WITNESSES:
Gilbert Beamish
Utley E. Crane Jr.

INVENTOR
Robt. F. Scott
BY
Chas. N. Butler
ATTORNEY.

UNITED STATES PATENT OFFICE.

ROBERT F. SCOTT, OF PHILADELPHIA, PENNSYLVANIA, ASSIGNOR TO EDWIN HARRINGTON, SON AND COMPANY, INCORPORATED, OF PHILADELPHIA, PENNSYLVANIA.

HOISTING MECHANISM.

No. 839,325.

Specification of Letters Patent.

Patented Dec. 25, 1906.

Application filed November 12, 1904. Serial No. 232,476.

*To all whom it may concern:*

Be it known that I, ROBERT F. SCOTT, a citizen of the United States, residing at Philadelphia, in the county of Philadelphia and State of Pennsylvania, have invented certain Improvements in Hoisting Mechanism, of which the following is a specification.

This invention relates particularly to hoisting-chains and bearings therefor.

It comprises a chain-wheel with sprockets having bearing-surfaces with straight elements square with reference to the plane of rotation and a chain having end bearing-surfaces with substantially straight elements coinciding with the elements of the sprockets or square with reference to the plane of rotation. The sprockets and chain links are thus provided with contacting bearing-surfaces at right angles to the line of force to prevent slipping, wear, and distortion and to provide continuously the smooth and accurate movement, which is a desideratum not commonly maintained in apparatus of this description. The links engaged by the sprockets are drop-forged, with substantially rectangular outer lines and curved internal bearings for the connecting-links, by which the desired accuracy, strength, and durability may be obtained.

Figure 1:
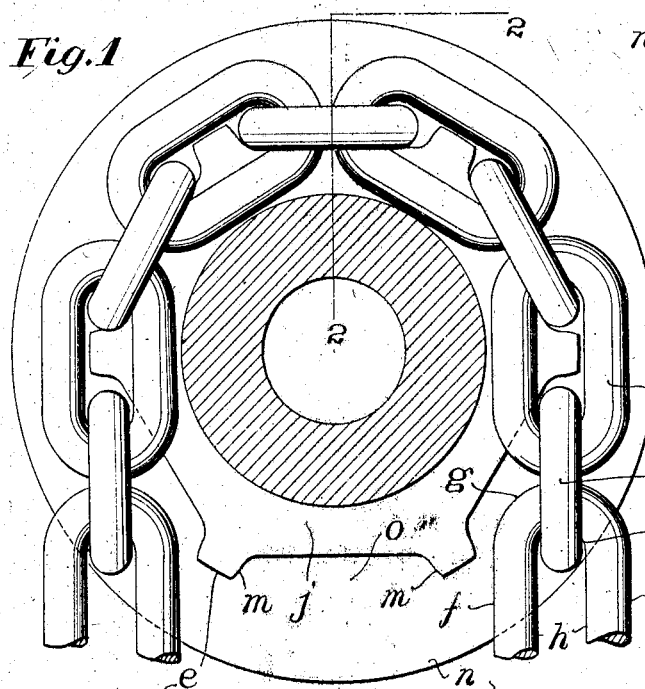
Figure 2:
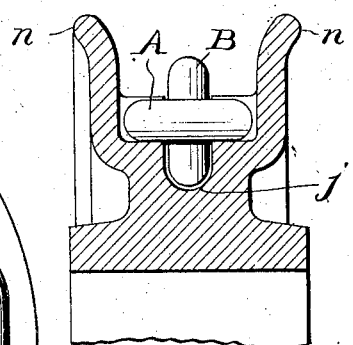
Figure 3:
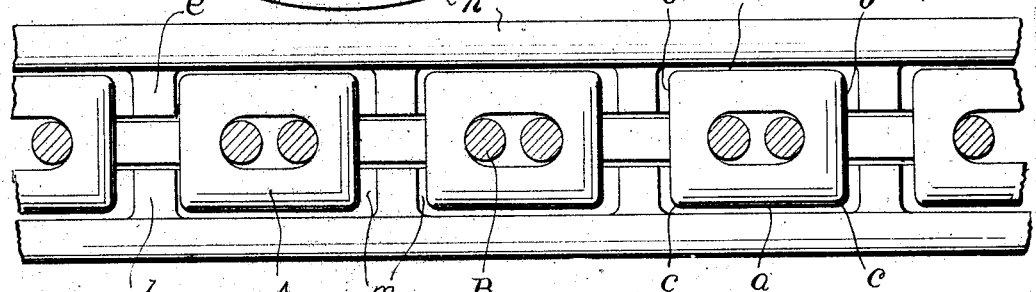
Figure 4:
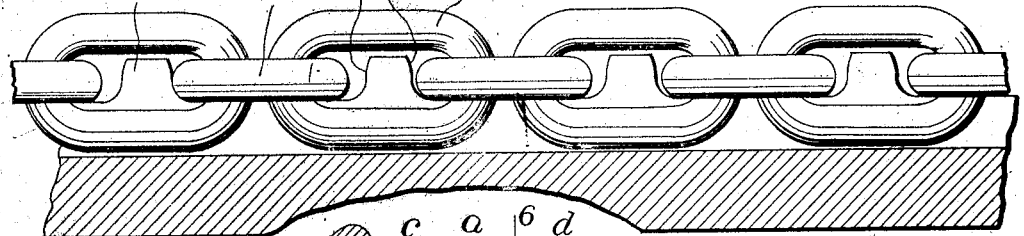
Figures 5, 6, 7:
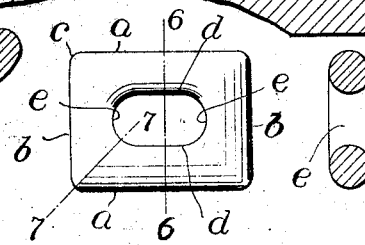

In the accompanying drawings, Figure 1 is a sectional view taken parallel to the plane of rotation of a wheel and chain embodying my invention. Fig. 2 is a sectional view taken on the line 2 2 of Fig. 1, the link in the plane of intersection being shown in full. Fig. 3 is a developed peripheral view of the wheel and chain. Fig. 4 is a developed elevation of the chain and sprockets. Fig. 5 is a plan view of the improved link employed in the chain. Fig. 6 is a sectional view taken on the line 6 6 of Fig. 5, showing the normal section of the link; and Fig. 7 is a sectional view taken on the line 7 7 of Fig. 5, showing the reinforced link-section which results from the bearings employed and provides the strength desired.

As shown in the drawings, the chain comprises the links A and B.

The links A have the straight outer sides $a$ and the straight outer ends $b$, joined by the slight corner-curves $c$, forming approximately a rectangle, and the straight inner sides $d$, joined by the curved bearings $e$, producing a form having the section 7 7 taken through a corner of the link and the center of a curved inner bearing, which is an oval having a minor axis equal to the normal section of the link and a major axis sufficiently in excess thereof to provide the desired internal and external bearings and prevent all tendency to collapsing or distortion. These links are designed to be drop-forged and can therefore readily be made accurate in form from steel of the character desired for strength and wear, avoiding the weaknesses and inaccuracies found in the usual welded links and securing superior endurance and continued accuracy of operation.

The links B, which connect the links A, may have the usual straight outer sides $f$, connected by curved outer ends $g$, and straight inner sides $h$, joined by curved inner ends or bearings $i$, and they may be formed and welded in the usual manner.

The chain-wheel has the groove $j$ for guiding the links B and the sprockets $l$ for engaging the links A, the bearing-surfaces $m$ of the sprockets being substantially at right angles to the plane of rotation and to the wheel's peripheral flanges $n$. The bearing-surfaces $m$ of the sprockets converge toward the sprocket-curves, and the distance between the bearing-surfaces at the ends of the several pockets $o$ is enough greater than the length of the links A so that in lifting or lowering the engaging sprockets will pinch and gradually work into and out of engagement with the chain, which renders the action smooth, provides for freely releasing the chain, and prevents climbing.

The rectangular drop-forged links for engaging the sprockets are made shorter than the hand-welded connecting-links to give more room in the pockets and to prevent climbing that has heretofore resulted when the chain lengthens by stretching or wear.

A further reason for using the short and long links is found in the fact that it permits the use of comparatively short pockets, large sprockets, and obviates the tendency to collapse in the links engaging the sprockets and provides greater strength in the parts which it is desirable to maintain of constant size and form for accomplishing the action already indicated.

Having described my invention, I claim—

A chain comprising a set of links having a substantially rectangular outer plan and an inner plan terminating in ends each outlined by a single curve, a second set of links connecting said first links, in combination with a sprocket-wheel having a groove which engages and holds said second links in a vertical plane and sprockets which engage said first links disposed transversely to the vertical links, said sprockets extending substantially at right angles to said plane.

In testimony whereof I have hereunto set my hand, this 9th day of November, 1904, in the presence of the subscribing witnesses.

ROBT. F. SCOTT.

Witnesses:
ROBERT JAMES EARLEY,
UTLEY E. CRANE, Jr.